US009176987B1

(12) United States Patent
Peng et al.

(10) Patent No.: US 9,176,987 B1
(45) Date of Patent: Nov. 3, 2015

(54) AUTOMATIC FACE ANNOTATION METHOD AND SYSTEM

(71) Applicant: TCL RESEARCH AMERICA INC., San Jose, CA (US)

(72) Inventors: Liang Peng, San Jose, CA (US); Yimin Yang, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 0 days.

(21) Appl. No.: 14/468,800

(22) Filed: Aug. 26, 2014

(51) Int. Cl.
G06K 9/00 (2006.01)
G06F 17/30 (2006.01)
G06K 9/62 (2006.01)
G06T 5/00 (2006.01)
G06F 17/24 (2006.01)

(52) U.S. Cl.
CPC ........ G06F 17/30253 (2013.01); G06F 17/241 (2013.01); G06F 17/30289 (2013.01); G06F 17/30864 (2013.01); G06K 9/00228 (2013.01); G06K 9/6269 (2013.01); G06T 5/002 (2013.01); G06T 2207/10016 (2013.01); G06T 2207/30201 (2013.01)

(58) Field of Classification Search
USPC ................. 382/115, 118, 128, 154, 209, 278; 340/5.81, 5.83
See application file for complete search history.

(56) References Cited

U.S. PATENT DOCUMENTS

| 7,006,881 | B1 * | 2/2006 | Hoffberg | G05B 15/02 700/17 |
| 7,027,054 | B1 * | 4/2006 | Cheiky | H04N 5/262 345/473 |
| 7,242,988 | B1 * | 7/2007 | Hoffberg | G05B 19/0426 348/E5.102 |
| 7,903,870 | B1 * | 3/2011 | Budagavi | G06K 9/00228 382/117 |
| 7,984,602 | B2 * | 7/2011 | Kraenzle | A61C 17/005 29/896.1 |
| 8,352,400 | B2 * | 1/2013 | Hoffberg | G06N 7/06 706/10 |
| 8,503,791 | B2 * | 8/2013 | Conwell | G06F 17/30265 382/190 |

FOREIGN PATENT DOCUMENTS

CN 103299324 A 9/2013

* cited by examiner

Primary Examiner — Yosef Kassa
(74) Attorney, Agent, or Firm — Anova Law Group, PLLC

(57) ABSTRACT

An automatic face annotation method is provided. The method includes dividing an input video into different sets of frames, extracting temporal and spatial information by employing camera take and shot boundary detection algorithms on the different sets of frames, and collecting weakly labeled data by crawling weakly labeled face images from social networks. The method also includes applying face detection together with an iterative refinement clustering algorithm to remove noise of the collected weakly labeled data, generating a labeled database containing refined labeled images, finding and labeling exact frames containing one or more face images in the input video matching any of the refined labeled images based on the labeled database, labeling remaining unlabeled face tracks in the input video by a semi-supervised learning algorithm to annotate the face images in the input video, and outputting the input video containing the annotated face images.

20 Claims, 4 Drawing Sheets

AUTOMATIC FACE ANNOTATION METHOD AND SYSTEM

FIELD OF THE INVENTION

The present invention generally relates to the field of information technology and face annotation in video technologies and, more particularly, to automatic face annotation methods and systems in video utilizing semi-supervised learning on social network data.

BACKGROUND

With the fast growth of video-capturing devices, dramatic increase of network bandwidth and various forms of video-sharing social network, the number of available video content online and offline rapidly grows in recent years. Following this trend, the need for annotation of this large number of videos becomes high demanding for widely range of applications. Manual annotation for video is very time consuming with high cost of effort. Hence, automatic annotation in video has attracted a lot of attention in recent years. Human face is one of the most important and frequent object in videos. Therefore, automatic annotation on human has potentially large number of applications such as security, rich content generation on movies, medical analysis, video documentation and archiving.

However, face annotation in video often is a problem in computer vision that aims at locating and identifying human faces (i.e., giving the identity) in a video sequence using certain knowledge set with known identities (e.g., labeled images as training data). Face Recognition (FR) is an important component of face annotation. In general, there are two types of face recognition tasks. One type is FR in constrained environment which refers to the faces to be recognized existing in relatively stable and static background, and the other type is FR in unconstrained environment which refers to the faces to be recognized existing in the background which is non-stable with dynamic changes. The FR in unconstrained environment is much more challenging due to the large variation in terms of orientation, luminance, and expression, etc. The Face annotation in video belongs to the unconstrained category due to the nature of the various forms of videos. In order to improve the annotation accuracy, existing methods with various frameworks, features and classifiers typically involve some manual work to produce training data (i.e., labeled face images).

The disclosed methods and systems are directed to solve one or more problems set forth above and other problems.

BRIEF SUMMARY OF THE DISCLOSURE

One aspect of the present disclosure includes an automatic face annotation method in video utilizing semi-supervised learning on social network data. The method includes dividing an input video into different sets of frames, extracting temporal and spatial information by employing camera take and shot boundary detection algorithms on the different sets of frames of the input video, and collecting weakly labeled data by crawling weakly labeled face images from social networks. The method also includes applying face detection together with an iterative refinement clustering algorithm to remove noise of the collected weakly labeled data, generating a labeled database containing refined labeled images as training data, and finding exact frames in which these face images appear from the video based on the refined labeled images stored in the labeled database. Further, the method includes labeling remaining unlabeled face tracks by semi-supervised learning and outputting a video containing annotated faces.

Another aspect of the present disclosure includes an automatic face annotation system in video. The system includes a camera take detection module configured to extract temporal and spatial information by employing camera take and shot boundary detection algorithms on different sets of frames of an input video. The system also includes a social web data analysis module configured to collect weakly labeled data by crawling weakly labeled face images from social networks, apply face detection together with an iterative refinement clustering algorithm to remove noise and generate a labeled database containing refined labeled images as training data and a face matching module configured to find exact frames in which these face images appear from the video based on the refined labeled images. Further, the system includes an active semi-supervised learning module configured to label remaining unlabeled face tracks by semi-supervised learning and an output module configured to output a video containing annotated faces.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
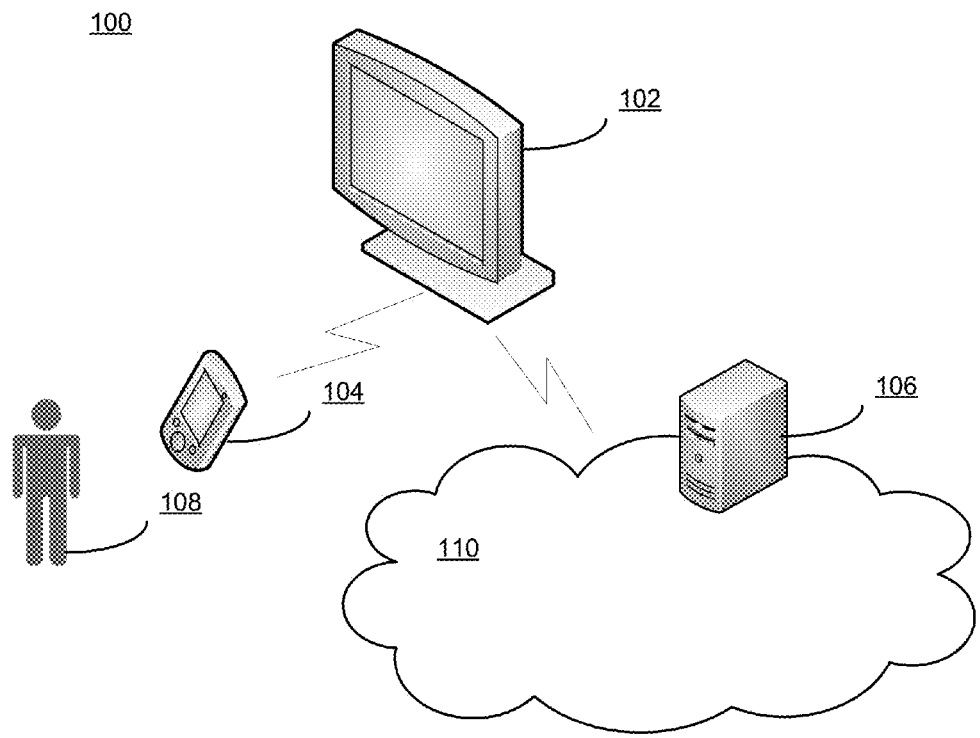
FIG. 1 illustrates an exemplary environment incorporating certain embodiments of the present invention.

FIG. 1 illustrates an exemplary environment 100 incorporating certain embodiments of the present invention. As shown in FIG. 1, environment 100 may include a television set (TV) 102, a remote control 104, a server 106, a user 108, and a network 110. Other devices may also be included.

TV 102 may include any appropriate type of TV, such as plasma TV, liquid crystal display (LCD) TV, projection TV, non-smart TV, or smart TV. TV 102 may also include other computing systems, such as a personal computer (PC), a tablet or mobile computer, or a smart phone, etc. Further, TV 102 may be any appropriate content-presentation device capable of presenting multiple programs in one or more channels, which may be controlled through the remote control 104.

The remote control 104 may include any appropriate type of remote control that communicates with and controls the TV 102, such as a customized TV remote control, a universal remote control, a tablet computer, a smart phone, or any other computing device capable of performing remote control functions. The remote control 104 may also include other types of devices, such as a motion-sensor based remote control, or a depth-camera enhanced remote control, as well as simple input/output devices such as a keyboard, a mouse, and a voice-activated input device, etc.

Further, the server 106 may include any appropriate type of server computer or a plurality of server computers for providing video contents to the user 108. The server 106 may also facilitate communication, data storage, and data processing between the remote control 104 and TV 102. TV 102, remote control 104, and server 106 may communicate with each other through one or more communication networks 110, such as a cable network, a phone network, and/or a satellite network, etc.

The user 108 may interact with TV 102 using remote control 104 to watch various programs and perform other activities of interest, or the user may simply use hand or body gestures to control TV 102 if motion sensor or depth-camera is used by TV 102. The user 108 may be a single user or a plurality of users, such as family members watching TV programs together.

Figure 2:
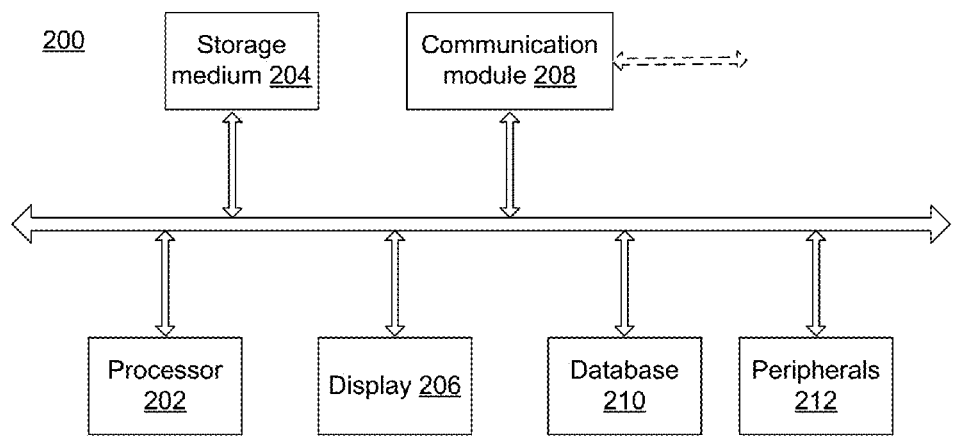
FIG. 2 illustrates an exemplary computing system consistent with the disclosed embodiments.

TV 102, remote control 104, and/or server 106 may be implemented on any appropriate computing circuitry platform. FIG. 2 shows a block diagram of an exemplary computing system 200 capable of implementing TV 102, remote control 104, and/or server 106.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data and for performing certain operations on the stored data, such as database searching.

In operation, the server 106, the TV 102, and/or the remote control 104 may perform an automatic face annotation process for the user 108. The automatic face annotation process may automatically label videos utilizing semi-supervised learning on social network data.

Figure 3:
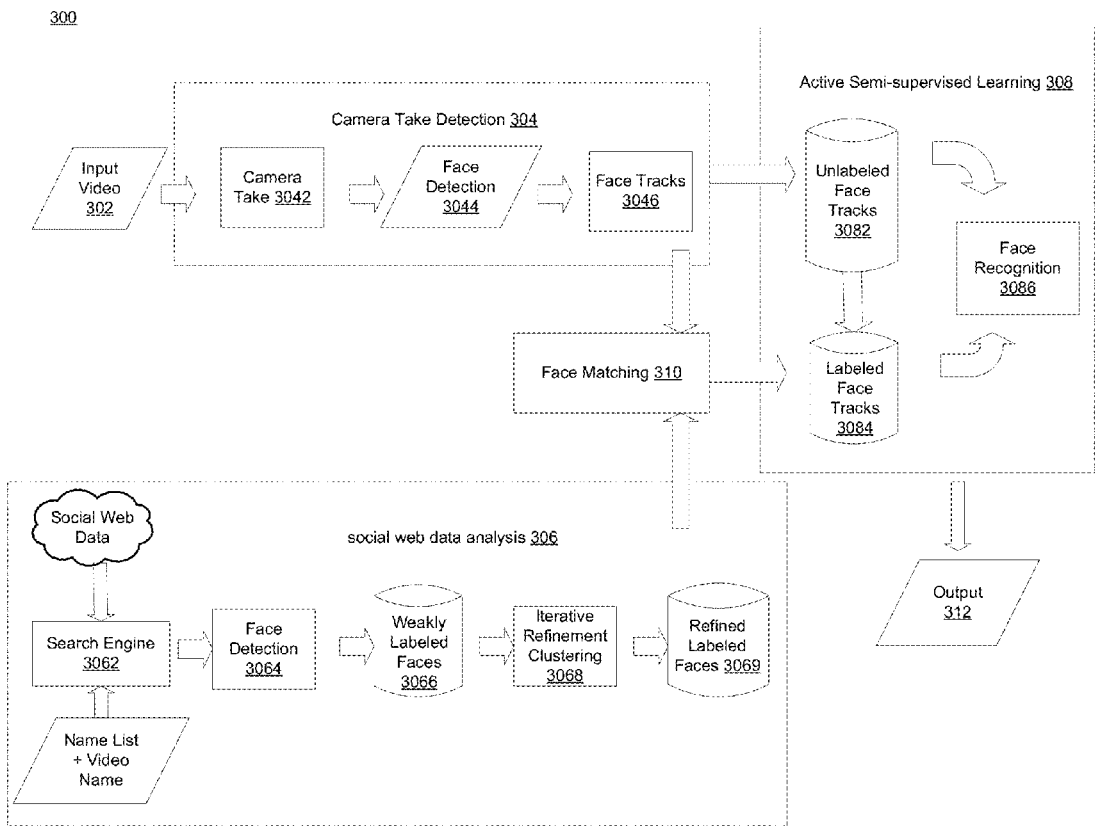
FIG. 3 illustrates a structure schematic diagram of an exemplary automatic face annotation system in video consistent with the disclosed embodiments.

FIG. 3 illustrates a structure schematic diagram of an exemplary automatic face annotation system in video consistent with the disclosed embodiments. As shown in FIG. 3, the automatic face annotation system 300 may include an input video 302, a camera take detection module 304, a social web data analysis module 306, an active semi-supervised learning module 308, a face matching module 310 and an output module 312. Certain components may be omitted and other components may be added. The system 300 (e.g., the various components) may be implemented in hardware, software, or a combination of hardware and software.

The input video 302 may include any appropriate type of source for video contents and may contain various video sources. The contents from the input video 302 may include both video data and metadata. Plurality of frames may be associated with the video content and may be provided to other modules for processing. A single picture may also be included. The input video is divided into different sets of frames.

The camera take detection module 304 may be configured to extract temporal and spatial information by employing camera take and shot boundary detection algorithms on the different sets of frames of the input video.

The camera take detection module 304 may further include a camera take submodule 3042, a face detection submodule 3044, and a face track submodule 3046. Other components or devices may also be included.

The camera take submodule 3042 may be configured to separate an original interleaved format video into a number of sequences with each corresponding to a registered camera that is aligned to an original camera setup by registering each camera from the incoming video frames.

The face detection submodule 3044 may be configured to find automatically the location of the faces in a sequence of video frames.

The face track submodule 3046 may be configured to extract face tracks from the video by processing each frame within each camera take. A new face track is initialized by the first detected face for each camera take. For rest frames of each camera take, if the distance between two detected faces from consecutive frames passes a pre-defined threshold, a new face track is initialized; otherwise, this face is added to the current face track.

The social web data analysis module 306 may be configured to collect weakly labeled data by crawling weakly labeled face images from social networks, to apply face detection together with an iterative refinement clustering algorithm to remove noise, and to generate a labeled database as training data.

The social web data analysis module 306 may further include a search engine 3062, a face detection submodule 3064, a weakly labeled face submodule 3066, an iterative refinement clustering submodule 3068, and a refined labeled face submodule 3069. Other components or devices may also be included.

The search engine 3062 may be a public search engine, for example Google image search or Baidu post community, or in-house database which has collection of movie-relevant photos. For a given movie and a set of actors for face annotation, each actor's (i.e., targeting actor) name and movie's name are used as key words for query from social networks.

The face detection submodule 3064 may be configured to find automatically the location of the faces in each image in the set obtained from the social networks.

The weakly labeled face submodule 3066 may be configured to obtain pure movie-relevant face images for each actor by filtering out the noise and store the obtained face images.

The iterative refinement clustering submodule 3068 may be configured to refine the labeled face images using an iterative refinement clustering algorithm. That is, the iterative refinement clustering submodule 3068 may apply the iterative refinement clustering algorithm and select the largest cluster to get the targeting actor's images and remove the noise.

The refined labeled face submodule 3069 may be configured to store the refined labeled face images.

Further, the face matching module 310 may be configured to find the exact frames in which these face images appear from the video based on these labeled images and scale-invariant feature transform (SIFT) matching technique.

The active semi-supervised learning module 308 may be configured to label the rest unlabeled face tracks by semi-supervised learning. The active semi-supervised learning module 308 may include an unlabeled face track database 3082, a labeled face track database 3084, and a face recognition module 3086. The unlabeled face track database 3082 may be configured to store the unlabeled face tracks. The labeled face track database 3084 may be configured to store the labeled face tracks. The face recognition module 3086 may be configured to recognize the faces existing in unconstrained environment and label the rest unlabeled face tracks.

The output module 312 may be configured to output annotated faces. Certain modules may be merged or omitted and other modules may be included.

Figure 4:
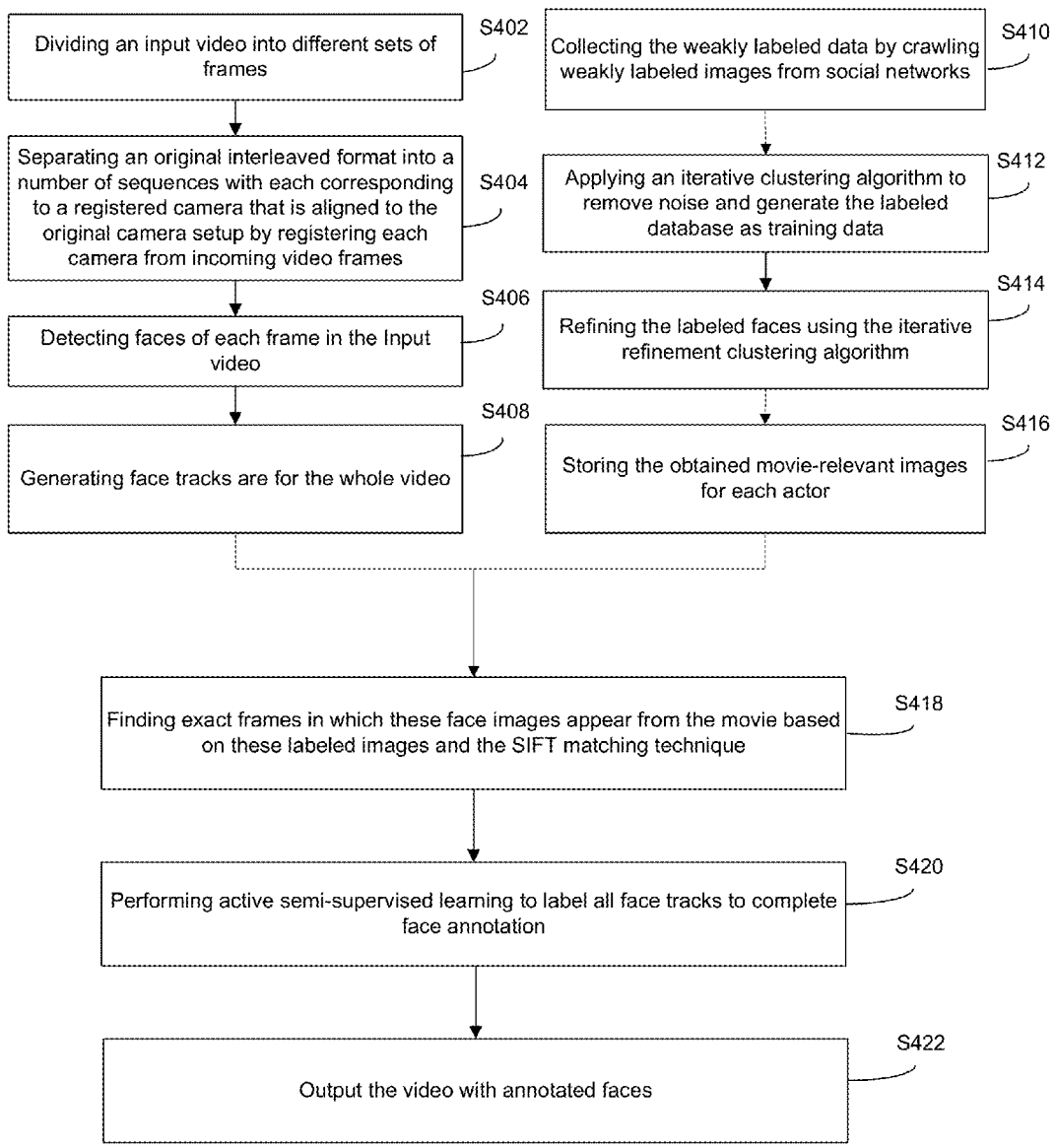
FIG. 4 illustrates a flow chart of an exemplary automatic face annotation process in video utilizing semi-supervised learning on social network data consistent with the disclosed embodiments.

FIG. 4 illustrates a flow chart of an exemplary automatic face annotation process 400 in video utilizing semi-supervised learning on social network data.

As shown in FIG. 4, at the beginning, an input video is divided into different sets of frames (S402). Since a video is essentially a sequence of frames and the changes between consecutive frames are relatively small due to typical frame rate for a video (e.g. 25 frames/second), instead of dealing with each frame individually, some grouping or clustering techniques may be applied to separate the whole video into different sets of frames with each set has similar frames for further processing.

Figure 6:
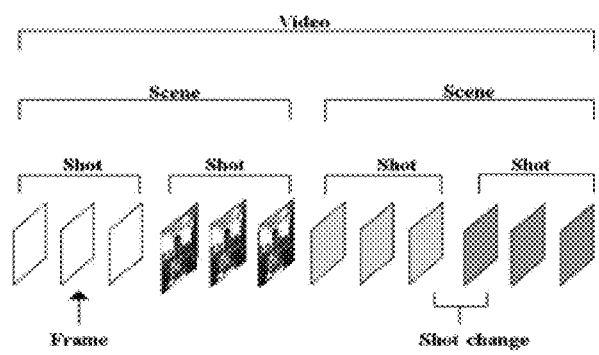
FIG. 6 shows a video stream being divided into different video components consistent with the disclosed embodiments.

For example, FIG. 6 shows a video stream being divided into different video components. As show in FIG. 6, a video stream may be divided into scenes, a scene may be divided into shots, and a shot may be divided into frames, etc. The frame can be further divided into objects and features of the video frame may be extracted for further processing. This process may be achieved by using the camera take detection module 304.

After obtaining the input video sequences, the video sequence is simplified into a frame sequence corresponding to registered camera that is aligned to the original camera setup by registering each camera from incoming video frames (S404).

A typical movie sequence is an interleaved format of a number of camera shots, and a camera take is a continuous recorded performance with a given camera setup. Camera registration, as used herein, may refer to registration of different cameras capturing video frames in a video sequence/stream. The concept of camera registration is based on the camera takes in reconstruction of video edits. A typical video sequence is an interleaved format of a number of camera shots, and a camera take is a continuous recorded performance with a given camera setup. By registering each camera from the incoming video frames, the original interleaved format can be separated into a number of sequences with each corresponding to a registered camera that is aligned to the original camera setup.

After the camera registration operation by the camera registration module, the near-duplicated images in the same camera take may be ignored, reducing the throughput while maintaining an acceptable recognition accuracy. That is, the camera registration may be performed to register certain different camera takes in the video frames to simplify the video frames and to provide the simplified video frames for next step of processing.

Figure 5:
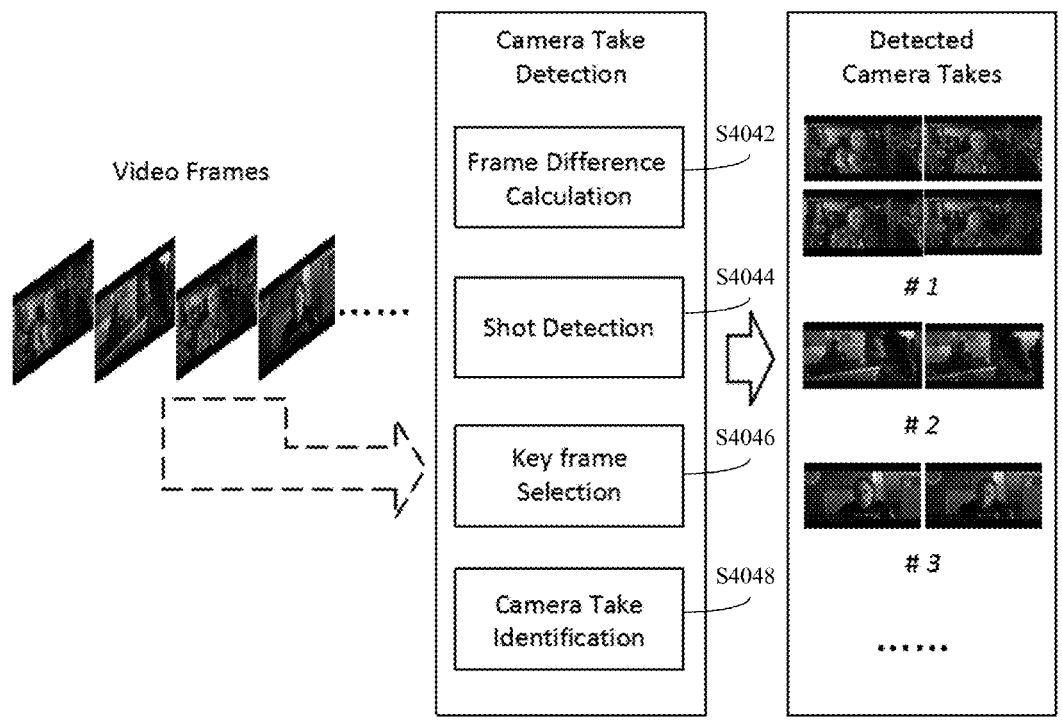
FIG. 5 illustrates a schematic diagram of an exemplary camera take detection process consistent with the disclosed embodiments.

FIG. 5 illustrates a schematic diagram of an exemplary camera take detection process consistent with the disclosed embodiments. As shown in FIG. 5, there are several steps as following for camera take detection.

A camera take is a series of consecutive frames taken by a camera. It can be cut into a sequence of segments and interleaved with other camera takes to form a scene which completes an event or a story in a video sequence. Based on the assumption that two consecutive frames in a video shot should have high similarity in terms of visual content, the frame difference is calculated using a similarity indicator, such as color histogram (or raw pixel values for saving computational cost) as a measurement of similarity between two frames (S4042). Optionally, a plurality of similarity calculation algorithms may be implemented with different computational complexity and computation speeds.

The video shots are detected in a video sequence (S4044). If the frame difference is above a preset threshold, a new shot is claimed. The selection of the threshold, if not selected properly, may cause over segmentation or down segmentation depending on the types of video programs (e.g., action, drama, etc.). To determine a threshold and further refine the detection results, certain constraints may apply, such as shot duration.

A key frame that can represent visual content of a shot is selected (S4046). That is, a key frame may be selected to represent the visual content of a shot using a predetermined algorithm. For example, the first frame of a shot is selected as the key frame for later processing. Other methods may also be used to select (or generate) the most representative key frame(s).

Further, the camera take is identified (S4048). Each detected shot (represented by the key frame) is matched with the last shot in each detected camera take. If certain matching criterion is satisfied, then the current shot is added to the end of the matched camera take. It is based on the assumption that a shot is most related to the one with closest temporal relationship. Initially, within a certain time period, the first shot is assumed as a camera take. The matching strategies vary from sift point matching to frame difference matching depending on various performance requirement. In addition, a camera retirement strategy may be used. That is, after a certain period time that a camera take has no matched image, the camera is consider "retried" and removed from the list of registered cameras. As shown in FIG. 5, camera number/camera take #1, #2, #3 are detected and identified.

Returning to FIG. 4, after the camera take is identified, faces of each frame in the video are detected (S406). For face annotation, detecting the faces of each frame in the video can facilitate to produce face tracks before applying face recognition. That is, the face detection can be applied for each frame within each camera take. The face detection may find automatically the location of the faces in a sequence of frames. For example, a classic Viola & Jones face detection algorithm may be applied to detect the faces.

It can be provided that N represents the total number of frames that composes a video with each frame denoted as $F_i$ (i=1, ..., N), and $A_{i,a}$ represents the ath face on $F_i$ ($\alpha$=1, ..., $X_i$, where $X_i$ is the total number of faces in $F_i$). For each frame $F_i$, locations of possible appearances of $A_{i,a}$ are found out by using bounding boxes $B_{i,a}$ with x, y denoting the horizontal and vertical coordinates of box's upper-left corner, and w,h as the width and height of the box. Typically face detection is employed to find x, y, w, and h first. After the face detection is applied for each frame within each camera take, the bounding box $B_{i,a}$ is identified.

The group of detected faces within a same camera take may be used as a face track. In this way, face tracks are generated for the whole video (S408).

Specifically, a new face track is initialized by the first detected face for each camera take. For the rest frames of each camera take, if the distance between two detected faces from consecutive frames passes a pre-defined threshold, a new face track is initialized; otherwise this face is added to the current face track.

Instead of manually labeling the face images for preparing training data, a large number of weakly labeled face images available on the web are used. These weakly labeled data usually contain noise (e.g. other people's images). The weakly labeled data is collected by crawling weakly labeled face images from social networks (S410). For example, a given movie and a set of actors for face annotation, each actor's (i.e., targeting actor) name and movie's name are used as key words for query in public search engines (e.g. Google image search or Baidu post community), or in-house database which has collection of movie-relevant photos, to retrieve a set of images. By nature of the social network whose search results are based on text description of images, this image set may contain mostly the targeting actor's images and a few other actors, with each image containing one or more actor's faces.

Face detection technique is applied to each image in the set obtained from the previous steps. Therefore, each actor has a set of detected face images. However, this face image set contains three types of noise: (a) non-movie relevant faces which are the face images of the targeting actor from non-movie relevant background (These face images have large variation in terms of pose, illumination, makeup and expression from their appearances inside the movie, so the non-movie relevant faces should be filtered out from training data); (b) Other actor's face images which are wrongly labeled for targeting images; and (c) Non-face images generated by false detection from a face detector.

An iterative refinement clustering algorithm is applied to remove the noise and generate a labeled database as training data (S412).

Due to the nature of social network, the face image set for each actor composed by the majority of the targeting actor and a few of images from three types of noise mentioned above. Hence, the labeled face images are refined using the iterative refinement clustering algorithm (S414). The iterative refinement clustering algorithm is applied and the largest cluster is selected to get the targeting actor's images and remove the noise.

The iterative refinement clustering algorithm works as follows. A feature vector (e.g., Local Binary Pattern (LBP)) is used to represent each face. A new class label is initialized by the first face image, and then each unlabeled face image set is looped through and the face recognition is performed by a pre-set distance threshold with the nearest neighbor. The face recognition (FR) is considered as a classification problem on the bounding box $B_{i,a}$, that is, to assign a class label from a set $\{C_i\}$, where $\{C_i\}$ (i=1, . . . , K) represents the class labels set of possible people/characters for annotation.

If the threshold does not be passed, a new class label is created to update the model. After first iteration, the representative face (e.g., centroid) of each cluster is chosen and small clusters are dropped. Then, the next iteration is performed with the repeated steps until convergence (i.e., the clusters does not change anymore).

Further, the obtained movie-relevant images for each actor from the previous step are stored (S416).

Based on these labeled images and SIFT matching technique, the exact frames in which these face images appear from the movie can be found (S418). That is, a face matching is performed to determine a match between the faces within each camera take and stored faces. Since these stored face images are labeled, the label can be assigned to the faces of these found frames with 100% confidence (assuming the correctness of frame matching).

After performing the above steps, the face tracks are generated and a small portion of these tracks matching with online movie-relevant labeled face data are also labeled.

The face annotation in video may include extracting face tracks from video (e.g. using tracking, location information, etc.) and performing face recognition on these face tracks individually. However, unlike conventional face recognition which targets at set of statics images, the video contains rich spatial and temporal information. The goal is to label the rest unlabeled face tracks using the spatial and temporal information, which could be treated as a semi-supervised learning problem. Specifically, it is a clustering process with partially labeled data. That is, there is at least one labeled data point for each class.

In certain embodiments, active semi-supervised learning is performed to label all face tracks (S420). The camera take and shot boundary detection algorithms are used to extract temporal and spatial information, and the extracted information is used to formulate a semi-supervised learning problem with constraints, so the clustering accuracy can be dramatically increased. The problem is formulated and the solution is provided as follows.

Let $R=\{R_i\}$ represent a set of all face tracks from the video, where (i=1, . . . , M) and M is a total number of face tracks from the video. For each face image, a feature vector that is sensitive to identities of the faces is chosen, but the feature is invariant to variation of pose, luminance and facial expression (e.g. Local Binary Pattern (LBP)). Empirical studies show that using a representation of central tendency of a face track can significantly simplify computation while still preserving the good representativeness due to small variation within each face track. Hence, a signature feature from each face track is generated by averaging salient feature vectors from all faces within each face track. Provided that, S represents the signature face features from a set of all face tracks with P features, so $S_{i,j}$ represents the value of the jth feature dimension for the ith face track signature; K represents a total number of final clusters (i.e., the number of people to be annotated); and $C_i$ denotes a cluster label to which face i is assigned, where $1 \leq C_i \leq K$. By definition of k-means clustering, an objective function without considering any constraint is represented by:

$$\sum_{k=1}^{K} \sum_{C_{i_1}=k} \sum_{C_{i_2}=k} \sum_{j=1}^{P} (S_{i_1,j} - S_{i_2,j})^2 \qquad (1)$$

For constrained clustering, grouping of similar objects into several clusters has to satisfy some additional constraints. More specifically, due to the temporal and spatial information from the video, the constraints include the following:

1. A cannot-link constraint is used to specify that two instances in the cannot-link relation cannot be associated with the same cluster. The face track including non-overlapping detected faces on one single frame contains distinct identities. For each frame $F_i$ in video, the non-overlapping detected faces are represented by the bounding box $B_{i,x}$ (i=1, . . . , N) with i representing a frame index and $C_x$ representing the assigned cluster label. That is, the constraint as "cannot-link" faces is defined by:

$$C_{x_1} \neq C_{x_2} \text{ if } x_1 \neq x_2 \text{ for any given } B_{i,x} (i=1,\ldots,N) \qquad (2)$$

2. A must-link constraint is used to specify that the two instances in the must-link relation should be associated with the same cluster. If signatures of two face tracks have small change in terms of bounding boxes location, and the signatures of two face tracks are from a same camera take, then the signatures of two face tracks have the same identity. The constraint as "must-link" faces is defined by:

$$C_{x_1} = C_{x_2} \text{ if Overlap}(B_{i_1,x_1}, B_{i_2,x_2}) \leq \theta \text{ and CameraTake} \\ (i_1, i_2) = 1 \quad (3)$$

where Overlap is a function to measure how much two bounding boxes overlapped; $\theta$ is a pre-set threshold for determining if two boxes are overlap; and CameraTake is an indicator function that depends on if two frames are from the same camera take.

Thus, based on equations (2) and (3), these two constraints as "cannot-link" faces and "must-link" faces can be formulated. Both a must-link and a cannot-link constraint define a relationship between two data instances. These sets of constraints acts as a guide for which a constrained clustering algorithm attempts to find clusters in a data set which satisfy the specified must-link and cannot-link constraints.

Therefore, combining equations (1), (2) and (3), the following objective function is defined by:

$$\varphi = \sum_{k=1}^{K} \sum_{C_{i_1}=k} \sum_{C_{i_2}=k} \sum_{j=1}^{P} (S_{i_1,j} - S_{i_2,j})^2 + \\ \sum_{i_2=1,\ldots,M} \sum_{i_1=1,\ldots,M} w_{i_1,i_2} \times I(C_{i_1} \neq C_{i_2}) + \\ \sum_{i_2=1,\ldots,M} \sum_{i_1=1,\ldots,M} w_{i_1,i_2} \times I(C_{i_1} = C_{i_2}) \quad (4)$$

where $w_{i,j}$ represents a weight for penalty of violating the "must-link" constraint; $(1-w_{i,j})$ represents a weight for penalty of violating the "cannot-link" constraint; Z represents the set of all "must-link" face track pairs, so $(S_{i,*}, S_{j,*}) \in Z$ means $S_{i,*}$ and $S_{j,*}$ must be assigned to a same face cluster; and C represents the set of all "cannot-link" face track pairs, so $(S_{i,*}, S_{j,*}) \in C$ means $S_{i,*}$ and $S_{j,*}$ can be assigned to different people's face clusters.

In clustering with hard constraints, the goal is to minimize the objective function subject to satisfying the constraints. That is, the goal is to assign all face tracks with a label $C_i$ to minimize the equation (4). The minimization of the objective function defined in equation (4) is equivalent to maximizing the posterior configuration probability of Hidden Markov Random Field, which can be solved by a Metric Pair-wise Constrained K-Means (PCKMeans) algorithm. The MPCK-Means algorithm is a semi-supervised algorithm derived from K-Means that incorporates both metric learning and the use of pair wise constraints.

After all face tracks are labeled, i.e., face annotation of the video is completed, the video with annotated face is output (S422). For example, the video with annotated face may be displayed to the user, or the video with annotated face may be provided to another program or device for further processing.

By using the disclosed systems and methods, many advantageous applications can be implemented. For example, the face annotation techniques may be applied to the news video domain where faces of key persons in a video can be automatically detected and annotated to facilitate various multimedia management tasks, such as news video summarization, retrieval and browsing.

It is understood that the disclosed automatic face annotation model is not limited to TV usage scenario. The disclosed systems and methods can also be applied to any devices with displays, such as smart phones, tablets, PCs, smart watches, and so on. The disclosed methods can also be applied as the core function for other systems, such as content-based video recommendation systems, content-based video retrieval systems, and so on.

Further, although the automatic face annotation method is disclosed for illustrative purposes, similar concept and approach can be applied to other annotation systems, for example, image annotation, etc. Other applications, advantages, alternations, modifications, or equivalents to the disclosed embodiments are obvious to those skilled in the art.

What is claimed is:

1. An automatic face annotation method, comprising:
   dividing an input video into different sets of frames;
   extracting temporal and spatial information by employing camera take and shot boundary detection algorithms on the different sets of frames of the input video;
   collecting weakly labeled data by crawling weakly labeled face images from social networks;
   applying face detection together with an iterative refinement clustering algorithm to remove noise of the collected weakly labeled data;
   generating a labeled database containing refined labeled images as training data;
   based on the refined labeled images stored in the labeled database, finding and labeling exact frames containing one or more face images in the input video matching any of the refined labeled images in the labeled database;
   labeling remaining unlabeled face tracks in the input video by a semi-supervised learning algorithm to annotate the face images in the input video; and
   outputting the input video containing the annotated face images.

2. The method according to claim 1, wherein extracting temporal and spatial information by employing camera take and shot boundary detection algorithms on the different sets of frames of the input video further includes:
   separating an original interleaved format into a number of sequences with each corresponding to a registered camera that is aligned to an original camera setup by registering each camera from incoming video frames;
   finding automatically location of faces in a sequence of video frames; and
   extracting face tracks from the video by processing each frame within each camera take.

3. The method according to claim 2, wherein extracting face tracks from the video by processing each frame within each camera take further includes:
   initializing a new face track by a first detected face for each camera take;
   for remaining frames of each camera take, when a distance between two detected faces from consecutive frames passes a pre-defined threshold, initializing a new face track; and
   for remaining frames of each camera take, when the distance between two detected faces from consecutive frames does not pass the pre-defined threshold, adding this face to a current face track.

4. The method according to claim 1, wherein collecting weakly labeled data and applying face detection together with an iterative refinement clustering algorithm to remove noise further includes:
   querying key words from one of social networks and an in-house database;
   finding automatically location of the faces in each image in a set obtained from the social networks;

obtaining pure movie-relevant face images for each actor by filtering out the noise;

storing the obtained movie-relevant face images;

refining the labeled face images using the iterative refinement clustering algorithm; and storing the refined labeled face images in the labeled database as the training data.

5. The method according to claim 2, wherein separating an original interleaved format into a number of sequences with each corresponding to a registered camera that is aligned to an original camera setup by registering each camera from incoming video frames further includes:

calculating frame difference using color as a measurement of similarity between two frames;

detecting a number of video shots in a video sequence;

selecting a key frame that represents visual content of a shot; and identifying the camera take.

6. The method according to claim 5, wherein detecting a number of video shots in a video sequence further includes:

when the frame difference is above a preset threshold, claiming a new shot, wherein selection of the preset threshold depends on types of video programs, and certain constraints are applied in order to determine a threshold and further refine detection results.

7. The method according to claim 5, further including:

matching each detected shot with a last shot in each detected camera take, wherein each detected shot is represented by the key frame; and when certain matching criterion is satisfied, adding a current shot to an end of a matched camera take.

8. The method according to claim 1, wherein:

provided that S represents signature face features from a set of all face tracks with P features; $S_{i,j}$ represents a value of a jth feature dimension for a ith face track signature; K represents a total number of final clusters; and $C_i$ denotes a cluster label to which face i is assigned, an objective function of the signature face features without considering any constraint is defined by:

$$\sum_{k=1}^{K} \sum_{C_{i_1}=k} \sum_{C_{i_2}=k} \sum_{j=1}^{P} (S_{i_1,j} - S_{i_2,j})^2,$$

wherein $1 \leq C_i \leq K$ and $1 \leq j \leq P$.

9. The method according to claim 8, wherein:

provided that, in each video frame $F_i$, $B_{i,x}$ (i=1, ..., N) is a bounding box with i representing a frame index; $C_x$ represents the assigned cluster label, a constraint as "cannot-link" faces is defined by:

$C_{x_1} \neq C_{x_2}$, when $x_1 \neq x_2$ for any given $B_{i,x}$(i=1, ..., N).

10. The method according to claim 8, wherein:

provided that Overlap is a function to measure how much two bounding boxes overlapped; θ is a pre-set threshold for determining whether the two boxes are overlap; CameraTake is an indicator function that depends on whether two frames are from a same camera take, a constraint as "must-link" faces is defined by:

$C_{x_1} = C_{x_2}$, when Overlap($B_{i_1,x_1}, B_{i_2,x_2}$)≤θ and CameraTake($i_1, i_2$)=1.

11. An automatic face annotation system, comprising:

a camera take detection module configured to extract temporal and spatial information by employing camera take and shot boundary detection algorithms on different sets of frames of an input video;

a social web data analysis module configured to collect weakly labeled data by crawling weakly labeled face images from social networks, apply face detection together with an iterative refinement clustering algorithm to remove noise and generate a labeled database containing refined labeled images as training data;

a face matching module configured to, based on the refined labeled images stored in the labeled database, find and label exact frames containing one or more face images in the input video matching any of the refined labeled images in the labeled database;

an active semi-supervised learning module configured to label remaining unlabeled face tracks in the input video by a semi-supervised learning algorithm to annotate the face images in the input video; and an output module configured to output the input video containing the annotated face images.

12. The system according to claim 11, wherein the camera take detection module further includes:

a camera take submodule configured to separate an original interleaved format into a number of sequences with each corresponding to a registered camera that is aligned to an original camera setup by registering each camera from incoming video frames;

a face detection submodule configured to find automatically location of faces in a sequence of video frames; and a face track submodule configured to extract face tracks from the video by processing each frame within each camera take.

13. The system according to claim 12, wherein the face track submodule is further configured to:

initialize a new face track by a first detected face for each camera take;

for remaining frames of each camera take, when a distance between two detected faces from consecutive frames passes a pre-defined threshold, initialize a new face track; and for remaining frames of each camera take, when the distance between two detected faces from consecutive frames does not pass the pre-defined threshold, add this face to a current face track.

14. The system according to claim 11, wherein the social web data analysis module further includes:

a search engine configured to query key words from one of social networks and an in-house database;

a face detection submodule configured to find automatically location of the faces in each image in a set obtained from the social networks;

a weakly labeled face submodule configured to obtain pure movie-relevant face images for each actor by filtering out the noise and store the obtained face images;

an iterative refinement clustering submodule configured to refine the labeled face images using the iterative refinement clustering algorithm; and a refined labeled face submodule configured to store the refined labeled face images.

15. The system according to claim 11, wherein the camera take submodule is further configured to:

calculate frame difference using color as a measurement of similarity between two frames;

detect a number of video shots in a video sequence;

select a key frame that represents visual content of a shot; and identify the camera take.

16. The system according to claim 15, wherein:

when the frame difference is above a preset threshold, a new shot is claimed, wherein selection of the preset threshold depends on types of video programs, and certain constraints are applied in order to determine a threshold and further refine detection results.

17. The system according to claim 15, wherein:

each detected shot is matched with a last shot in each detected camera take, wherein each detected shot is represented by the key frame; and when certain matching criterion is satisfied, a current shot is added to an end of a matched camera take.

18. The system according to claim 10, wherein:

provided that S represents signature face features from a set of all face tracks with P features; $S_{i,j}$ represents a value of a jth feature dimension for a ith face track signature; K represents a total number of final clusters; and $C_i$ denotes a cluster label to which face i is assigned, an objective function of the signature face features without considering any constraint is defined by:

$$\sum_{k=1}^{K} \sum_{C_{i_1}=k} \sum_{C_{i_2}=k} \sum_{j=1}^{P} (S_{i_1,j} - S_{i_2,j})^2,$$

wherein $1 \leq C_i \leq K$, and $1 < j < P$.

19. The system according to claim 18, wherein:

provided that, in each video frame $F_i$, $B_{i,x}$ (i=1, ..., N) is a bounding box with i representing a frame index; $C_x$ represents the assigned cluster label, a constraint as "cannot-link" faces is defined by:

$C_{x_1} \neq C_{x_2}$, when $x_1 \neq x_2$ for any given $B_{i,x}(i=1,...,N)$.

20. The system according to claim 18, wherein:

provided that Overlap is a function to measure how much two bounding boxes overlapped; θ is a pre-set threshold for determining whether the two boxes are overlap; CameraTake is an indicator function that depends on whether two frames are from a same camera take, a constraint as "must-link" faces is defined by:

$C_{x_1} = C_{x_2}$, when Overlap$(B_{i_1,x_2}, N_{i_2,x_2}) \leq \theta$ and CameraTake$(i_1,i_2)=1$.

* * * * *